United States Patent [19]

Matsubara

[11] Patent Number: 4,686,776
[45] Date of Patent: Aug. 18, 1987

[54] DEHYDRATING DEVICE

[75] Inventor: Mamoru Matsubara, Yokohama, Japan

[73] Assignee: Showa Denko Kabushiki Kaisha, Tokyo, Japan

[21] Appl. No.: 856,255

[22] Filed: Apr. 28, 1986

[30] Foreign Application Priority Data

Apr. 27, 1985 [JP] Japan .................................. 60-89902

[51] Int. Cl.⁴ ............................................. F26B 13/26
[52] U.S. Cl. .................................... 34/95; 34/9; 206/204; 210/502.1; 426/124; 428/474.7
[58] Field of Search ...................... 34/9, 95; 206/204; 426/124, 129, 112, 132, 443, 398; 428/474.7; 604/365, 368, 372, 376, 378; 99/467; 210/502.1

[56] References Cited

U.S. PATENT DOCUMENTS

| 4,340,479 | 7/1982 | Pall ................................. 210/500.21 |
| 4,383,376 | 5/1983 | Numamoto et al. . |
| 4,473,474 | 9/1984 | Ostreicher et al. ................. 210/650 |

OTHER PUBLICATIONS

U.S. patent application Ser. No. 732,208, filed on May 9, 1985.

Primary Examiner—Larry I. Schwartz
Attorney, Agent, or Firm—Sughrue, Mion, Zinn, Macpeak, and Seas

[57] ABSTRACT

A dehydrating device comprises a high osmotic pressure substance, a polymeric water absorber and a hydrophilic alcohol, which are co-present and are integrally covered with a semipermeable membrane allowing selective permeation of water. The dehydrating device is excellent in dehydrating capacity and particularly useful for removing water from foods.

10 Claims, 1 Drawing Figure

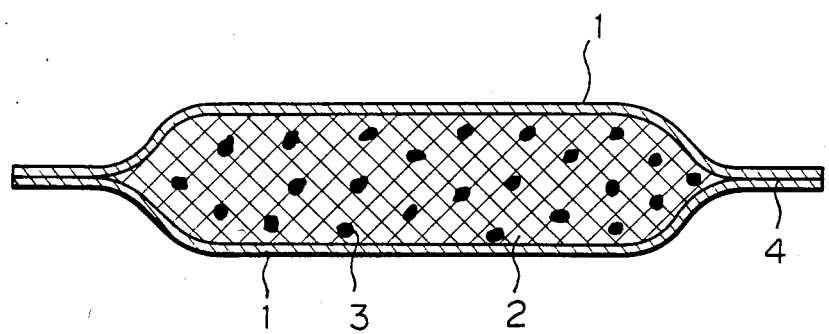

DEHYDRATING DEVICE

BACKGROUND OF THE INVENTION

1. Field of the Invention

The present invention relates to a dehydrating device. More particularly, the present invention relates to a dehydrating device effective for removing water from foods.

2. Description of the Related Art

As means which is contacted with a food to remove water therefrom at a low temperature under interception of air, there have been proposed various dehydrating devices, for example, devices disclosed in Japanese Examined Patent Publication No. 58-58124 and Japanese Patent Applications No. 59-88308, No. 59-88310 and No. 90893. These devices have a dehydrating function in principle and can be used for dehydration of foods. However, these known devices are defective in that handling is difficult, they are easily broken and production is difficult.

In U.S. Pat. No. 4,383,376, there is described a dehydrating sheet for drying protein-containing food. It was difficult to directly blend a polymeric water absorber with a hydrophilic high osmotic pressure substance. This is because the polymeric water absorber absorbs water contained in the high osmotic pressure substance to increase the viscosity of the blend and make the blend impossible to flow, which makes the preparation of a dehydrating sheet extremely difficult and because the blend becomes like solid poor in flowability and therefore results in a sheet poor in flexibility to make the contact of the sheet with an object to be dehydrated inferior so that the dehydrating capacity of the resulting sheet is poor. In order to overcome the problems, in U.S. Pat. No. 4,383,376, as is described in the examples, a construction has been proposed in which a polymeric water absorber is covered by paper or the like and a high osmotic pressure substance is arranged around the covered polymeric water absorber. However, for the preparation of the proposed sheet, it is necessary to provide a step to remove air from the space between the covering paper and the polymeric water absorber and also necessary to simultaneously handle liquids and solids, which makes the preparation of the sheet troublesome and expensive.

SUMMARY OF THE INVENTION

The present invention is to eliminate the above defects of the conventional dehydrating devices. It is therefore a primary object of the present invention to provide a dehydrating device which can be easily produced and handled, is excellent in the dehydrating capacity and can be used repeatedly without reduction of the dehydrating capacity.

In accordance with the present invention, there is provided a dehydrating device comprising a high osmotic pressure substance, a polymeric water absorber and a hydrophilic alcohol, which are co-present and are integrally covered with a semipermeable membrane allowing selective permeation of water.

BRIEF DESCRIPTION OF THE DRAWING

The FIGURE is a sectional view schematically illustrating an embodiment of the dehydrating device of the present invention.

DESCRIPTION OF THE PREFERRED EMBODIMENTS

In the dehydrating device of the present invention, the water-permeable semipermeable membrane may cover the entire device or may cover the device only at a part to be contacted with a material to be dehydrated. A water-permeable semipermeable membrane which is safe even on direct contact with a food is preferred. As the semipermeable membrane suitably used in the present invention, there can be mentioned, for example, ordinary cellophane, a lowly drawn vinylon film and a collodion membrane.

As the high osmotic pressure substance, there can be mentioned edible saccharides such as thick malt syrup obtained by acid saccharification or enzyme saccharification of starch, pullulan, glucose, fructose, mannitol, sorbitol and margetol, natural water-soluble polymers such as mannan, sodium alginate, carrageenan and gum arabic, and modified celluloses such as methyl cellulose and carboxymethyl cellulose (CMC). These substances may be used in the form of pure products or hydrides, or they may be used singly or in the form of mixtures of two or more of them.

As the polymeric water absorber, there may be used materials capable of forming a gel by hydration, which are commercially used for sanitary products, paper diapers and soil modifiers. For example, there can be used products obtained by graft-polymerizing water-soluble polymerizable monomers or polymerizable monomers rendered water-soluble by hydrolysis, such as acrylic acid, methacrylic acid, an acrylic acid salt, a methacrylic acid salt, an acrylic acid ester, a methacrylic acid ester, acrylic acid amide, methacrylic acid amide, acrylonitrile, methacrylonitrile, maleic acid, sulfonated styrene and polyvinylpyridine, or oligomers or co-oligomers thereof, to polysaccharides such as starch and celluloses, hydrolyzing the resulting polymers according to need and three-dimensionally cross-linking the resulting hydrophilic polymers with cross-linking agents, and products obtained by three-dimensionally crosslinking hydrophilic polymers such as polyethylene oxide, polypropylene oxide, polyvinyl pyrrolidone, sulfonated polystyrene, polyvinyl pyridine, polyacrylic acid salts, polyacrylic acid amide, polymethacrylic acid salts and polymethacrylic acid amide with crosslinking agents. PX-402A supplied by Showa Denko, IM-1000 supplied by Sanyo Kasei Kogyo, Aquakeep 10SH supplied by Seitetsu Kagaku Kogyo and Aqualic CA supplied by Nippon Shokubai Kagaku Kogyo are commercially available. However, polymeric water absorbers that can be effectively used in the present invention are not limited to those exemplified above.

Food additive alcohols such as ethyl alcohol, propylene glycol and glycerol are especially preferred as the hydrophilic alcohol. These alcohols may be used singly or in the form of mixtures of two or more of them.

In the dehydrating device of the present invention, it is preferred that the high osmotic pressure substance, the polymeric water absorber and the hydrophilic alcohol be at a ratio of 100:1 to 50:1 to 100, especially 100:3 to 30:3 to 50.

In the production of the dehydrating device of the present invention, at first, the polymeric water absorber is added to the hydrophilic alcohol, and the high osmotic pressure substance is incorporated into the mixture. Finally, the resulting mixture is cast on a sheet comprising the water-permeable semipermeable membrane. However, the process for the preparation of the dehydrating device of the present invention is not limited to this process. Namely, there may be adopted a process in which the hydrophilic alcohol is first mixed with the high osmotic pressure substance and the polymeric water absorber is then added to the mixture, or a process in which the hydrophilic alcohol, the high osmotic pressure substance and the polymeric water absorber are simultaneously mixed together.

One preferred embodiment of the dehydrating device of the present invention is illustrated in the FIGURE. In this embodiment, the polymeric water absorber 3 is dispersed in the continuous phase 2 formed of the high osmotic pressure substance and hydrophilic alcohol, and the whole dispersion is covered with the water-permeable semipermeable membrane 1 and this semipermeable membrane 1 is sealed in a sealed portion 4. There may be adopted a modification in which the semipermeable membrane 1 is used only for one surface and the other surface is covered with an appropriate sheet. Furthermore, there may be adopted a structure in which the dehydrating device is covered with the semipermeable membrane only at a surface portion to be contacted with a material to be dehydrated.

In the case of a mixture of the high osmotic pressure substance and the polymeric water absorber, the viscosity abruptly increases at the mixing step, but if the hydrophilic alcohol is added, this increase of the viscosity is greatly moderated. Futhermore, by adjusting the amount of the hydrophilic alcohol, the viscosity of the resulting mixture can be controlled.

The present invention will now be described in detail with reference to the following examples. Examples 1 through 3 and Comparative Example 1 illustrate influences of addition of the hydrophilic alcohol on the viscosity in the system of the dehydrating device according to the present invention.

EXAMPLE 1

As the high osmotic pressure substance, 100 g of Himal 38 (supplied by Sanmatsu Kogyo) (having a water content of 25%) was used, and 7 g of a polymeric water absorber (PX-402A supplied by Showa Denko) and 14 g of propylene glycol (food additive supplied by Showa Denko) were added to the high osmotic pressure substance and the mixture was stirred at 25° C. The change of the viscosity with the lapse of time was examined. The obtained results are shown in Table 1.

TABLE 1

| Time (minutes) | Viscosity (poises) |
|---|---|
| 0 | 50 |
| 2 | 52 |
| 4 | 62 |
| 6 | 79 |
| 8 | 99 |
| 10 | 120 |

EXAMPLE 2

The viscosity was measured under the same conditions as described in Example 1 except that glycerol (reagent of the first grade) was used instead of propylene glycol. The obtained results are shown in Table 2.

TABLE 2

| Time (minutes) | Viscosity (poises) |
|---|---|
| 0 | 65 |
| 2 | 98 |
| 4 | 130 |
| 6 | 150 |
| 8 | 180 |
| 10 | 210 |

COMPARATIVE EXAMPLE 1

As the high osmotic pressure substance, 100 g of Himal 38 (supplied by Sanmatsu Kogyo) (having a water content of 25%) was used and 7 g of a polymeric water absorber (PX-402A supplied by Showa Denko) was added thereto, and the mixture was stirred at 25° C. The change of the viscosity with the lapse of time was examined. The obtained results are shown in Table 3.

TABLE 3

| Time (minutes) | Viscosity (poises) |
|---|---|
| 0 | 55 |
| 2 | 185 |
| 4 | 240 |
| 6 | 290 |
| 8 | 370 |
| 10 | 460 |

EXAMPLE 3

As the high osmotic pressure substance, 100 g of Himal 38 (supplied by Sanmatsu Kogyo) (having a water content of 25%) was used and 7 g of a polymeric water absorber (PX-402A supplied by Showa Denko) and 3.5 g of propylene glycol (food additive supplied by Showa Denko) were added thereto, and the mixture was stirred at 25° C. The change of the viscosity with the lapse of time was examined. The obtained results are shown in Table 4.

TABLE 4

| Time (minutes) | Viscosity (poises) |
|---|---|
| 0 | 65 |
| 2 | 98 |
| 4 | 145 |
| 6 | 180 |
| 8 | 230 |
| 10 | 270 |

From the foregoing results, it is seen that since water in the high osmotic pressure substance promptly migrates into the polymeric water absorber, the concentration of the solution is elevated to cause abrupt increase in the viscosity and handling of the mixture becomes difficult (especially in Comparative Example 1). In contrast, since the hydrophilic alcohol is not substantially absorbed in the polymeric water absorber, in the system comprising the high osmotic pressure substance, the polymeric water absorber and the hydrophilic alcohol, the viscosity can be maintained at a low level as shown in Example 1 through 3, and the degree of increase of the viscosity can be moderated.

In the dehydrating device of the present invention, by making a hydrophilic alcohol present in the system comprising a high osmotic pressure substance and a polymeric water absorber, the following advantages can be attained:

(1) The semipermeable membrane is softened and the strength is increased.

(2) Migration of water is facilitated among the semipermeable membrane, the high osmotic pressure substance and the polymeric water absorber.

(3) The inherent softness and appropriate hardness of the dehydrating device can be maintained within a broad range of the water content, and therefore, handling becomes easy, the adhesion to a material to be dehydrated is improved and the dehydration efficiency is increased.

(4) When the dehydrating device is used again, it is necessary to dry the dehydrating device. At this drying step, the dehydrating device is converted to a hard plate-like state if the hydrophilic alcohol is not co-present, and in this case, the device is easily broken, the adhesion to a material to be dehydrated is degraded and the dehydration efficiency is drastically reduced. In contrast, in case of the dehydrating device of the present invention, such troubles hardly arise.

(5) Since the viscosity of the system can be freely controlled by adjusting the amount added of the hydrophilic alcohol, the dehydrating device of the present invention can be easily prepared. Namely, the applicable viscosity of an ordinary high viscosity liquid coater is 5,000 to 7,000 c.p., and the upper limit of the applicable viscosity in an especially high viscosity liquid coater is regarded as being 20,000 c.p. Accordingly, commercially available coating machines can be used for the system of the present invention.

(6) Even if the water content of the high osmotic pressure substance is low, increase of the viscosity can be prevented and the whole water content of the dehydrating device can be maintained at a low level, with the result that growth of microorganisms such as mildew can be controlled.

The present invention will be further illustrated with reference to the following working examples that by no means limit the scope of the invention.

WORKING EXAMPLE 1

A mixture comprising 100 g of a 75% aqueous solution of Himal 38 (supplied by Sanmatsu Kogyo), 14 g of propylene glycol (supplied by Showa Denko) and 7 g of a polymeric water absorber (PX-402A supplied by Showa Denko) was charged in a pouch of a vinylon film (LH-18 supplied by Tokyo Cellophane Paper), and the pouch was expanded into a sheet-like form having a thickness of 0.5 mm and the opening was heat-sealed to produce a dehydrating device. This dehydrating device was rich in the flexibility and had an appropriate hardness. The state of the contact of the dehydrating device with a material to be dehydrated was good.

An opened saurel was enveloped with ordinary cellophane (PT-300 supplied by Tokyo Cellophane Paper) and inserted in the dehydrating device, and dehydration was effected in a refrigerator maintained at 5° C. The obtained results are shown in Table 5.

TABLE 5

| Dehydration Time (hours) | Weight Loss (%) in Saurel |
| --- | --- |
| 3 | 3.8 |
| 5 | 5.2 |
| 10 | 9.5 |

The sheet used for the dehydration was dried and used again. This procedure was repeated 10 times. No substantial reduction of the dehydration capacity was caused. Furthermore, hardening of the device was not caused by drying.

COMPARATIVE WORKING EXAMPLE 1

A mixture of 100 g of Himal 38 (75% aqueous solution) and 7 g of a polymeric water absorber was charged in a pouch of a vinylon film, and the pouch was expanded. Since the viscosity of the mixture was very high, the pouch could not be expanded to a thickness smaller than 1 mm. The opening was heat-sealed to produce a dehydrating device.

An opened saurel was enveloped with ordinary cellophane paper and was inserted in the dehydrating device. Dehydration was effected at 5° C. The obtained results are shown in Table 6.

TABLE 6

| Results of Dehydration Test (Saurel) | |
| --- | --- |
| Dehydration Time (hours) | Weight Loss (%) in Saurel |
| 3 | 2.1 |
| 5 | 4.2 |
| 10 | 9.0 |

Since the dehydration device was hard, the initial adhesion was bad and the dehydration speed was low. With advance of the dehydration, the dehydration speed increased and after the lapse of 10 hours, the dehydration speed was almost as high as in Working Example 1 where propylene glycol was added. When the dehydrating device used for the dehydration was dried by a warm air current maintained at 30° C. for 3 hours, the dehydrating device was became hard and plate-like. When this device was forcibly bent, it was broken and could not be used again.

WORKING EXAMPLE 2

Beef liver (12 cm×20 cm×1.5 cm) was inserted in the same dehydrating device as prepared in Example 1 and dehydration was carried out at 0° C. The obtained results are shown in Table 7.

TABLE 7

| Results of Dehydration Test | |
| --- | --- |
| Dehydration Time (hours) | Weight Loss (%) in Liver |
| 3 | 2.5 |
| 5 | 3.8 |
| 10 | 7.2 |

When the used dehydrating device was dried by an air current maintained at 30° C., the device was sufficiently soft and it could be directly used again.

WORKING EXAMPLE 3

A mixture comprising 100 g of Himal (75% aqueous solution), 3.5 g of a polymeric water absorber and 7 g of propylene glycol was expanded on a vinylon sheet and a vinylon sheet was placed on the upper surface of the expanded mixture. The mixture was further expanded to a thickness of 0.5 mm and four sides were heat-sealed to produce a dehydrating device. Beef meat (19 cm×8 cm×1.5 cm) was enveloped with ordinary cellophane paper and inserted in the dehydrating device. Dehydration was carried out in a refrigerator maintained at 3° C. The obtained results are shown in Table 8.

TABLE 8

Results of Dehydration Test

| Dehydration Time (hours) | Weight Loss (%) in Meat |
| --- | --- |
| 1 | 0.42 |
| 2 | 0.81 |
| 3 | 1.26 |
| 4 | 1.61 |
| 5 | 2.11 |
| 6 | 2.45 |

When the test was conducted by using this sheet, reduction of the dehydrating capacity was not observed.

What is claimed is:

1. A dehydrating device comprising (1) a high osmotic pressure substance, (2) a polymeric water absorber and (3) a hydrophilic alcohol, wherein (1), (2) and (3) are integrally covered with a semipermeable membrane (4) allowing selective permeation of water.

2. A dehydrating device as set forth in claim 1, wherein the semipermeable membrane (4) is selected from the group consisting of cellophane, lowly drawn vinylon films and collodion membranes.

3. A dehydrating device as set forth in claim 1, wherein the high osmotic pressure substance (1) is selected from the group consisting of edible saccharides, natural water-soluble polymers and modified cellulose.

4. A dehydrating device as set forth in claim 1, wherein the polymeric water absorber (2) is selected from the group consisting of products obtained by graft-polymerizing water-soluble polymerizable monomers or polymerizable monomers rendered water soluble by hydrolysis to polysaccharides, hydrolyzing the resulting polymers as needed and three-dimensionally crosslinking the resulting hydrophilic polymers with crosslinking agents and products obtained by three-dimensionally crosslinking hydrophilic polymers with crosslinking agents.

5. A dehydrating device as set forth in claim 4, wherein the polymerizable monomers are selected from the group consisting of acrylic acid, methacrylic acid, an acrylic acid salt, a methacrylic acid salt, an acrylic acid ester, a methacrylic acid ester, an acrylic acid amide, a methacrylic acid amide, acrylonitrile, methacrylonitrile, maleic acid, sulfonated styrene and polyvinyl pyridine, and oligomers and co-oligomers thereof.

6. A dehydrating device as set forth in claim 4, wherein the hydrophilic polymers are selected from the group consisting of polyethylene oxide, polypropylene oxide, polyvinyl pyrrolidone, sulfonated polystyrene, polyvinyl pyridine, a polyacrylic acid salt, a polymethacrylic acid salt, a polyacrylic acid amide and a polymethacrylic acid amide.

7. A dehydrating device as set forth in claim 1, wherein the hydrophilic alcohol (3) is selected from the group consisting of ethyl alcohol, propylene glycol and glycerol.

8. A dehydrating device as set forth in claim 1, wherein the high osmotic pressure substance (1), the polymeric water absorber (2) and the hydrophilic alcohol (3) are present at a ratio of 100 parts of the high osmotic pressure substance (1) to 1 to 50 parts of the polymeric water absorber (2) to 1 to 100 parts of the hydrophilic alcohol (3).

9. A dehydrating device as set forth in claim 8, wherein the ratio is 100 parts of the high osmotic pressure substance (1) to 3 to 30 parts of the polymeric water absorber (2) to 3 to 50 parts of the hydrophilic alcohol (3).

10. A dehydrating device as set forth in claim 3, wherein the edible saccharide is a thick malt syrup, pullalan, glucose, fructose, mannitol, sorbitol or margetol, wherein said natural water-soluble polymer is mannan, sodium alginate, carrageenan or gum arabic, and wherein said modified cellulose is methyl cellulose or carboxymethyl cellulose.

* * * * *